United States Patent [19]

Ballantyne

[11] Patent Number: 4,570,893
[45] Date of Patent: Feb. 18, 1986

[54] DUAL CONTROL MECHANISM FOR A REMOTELY LOCATED MIRROR

[75] Inventor: David B. Ballantyne, Southfield, Mich.

[73] Assignee: General Motors Corporation, Detroit, Mich.

[21] Appl. No.: 605,059

[22] Filed: Apr. 30, 1984

[51] Int. Cl.⁴ ............................................. A47G 1/24
[52] U.S. Cl. .................. 248/487; 74/501 M; 74/479; 74/424.8 R; 350/636
[58] Field of Search ............... 248/487, 479, 481, 485, 248/486; 74/501 M, 479, 424.8 R, 89.15; 350/636, 637

[56] References Cited

U.S. PATENT DOCUMENTS

| | | | |
|---|---|---|---|
| 2,903,944 | 9/1959 | Cooper | 74/501 M |
| 2,953,934 | 9/1960 | Sundt | 74/424.8 R |
| 3,190,140 | 6/1965 | Werner | 74/424.8 R X |
| 3,253,509 | 5/1966 | Peters | 74/501 M X |
| 3,370,479 | 2/1968 | Noord | 248/487 X |
| 3,411,372 | 11/1968 | Skillin | 74/501 M |
| 4,227,426 | 10/1980 | Schwanz et al. | 74/424.8 R |
| 4,395,924 | 8/1983 | Callahan | 74/424.8 R |

Primary Examiner—Ramon S. Britts
Assistant Examiner—David M. Purol
Attorney, Agent, or Firm—Edward J. Biskup

[57] ABSTRACT

A dual control mechanism which includes a pair of screw drives that are connected at one end to a universally pivotally supported element at spaced points thereof and are connected at the other end to a pair of knobs which are rotatable about a common axis for adjusting the position of the element.

6 Claims, 5 Drawing Figures

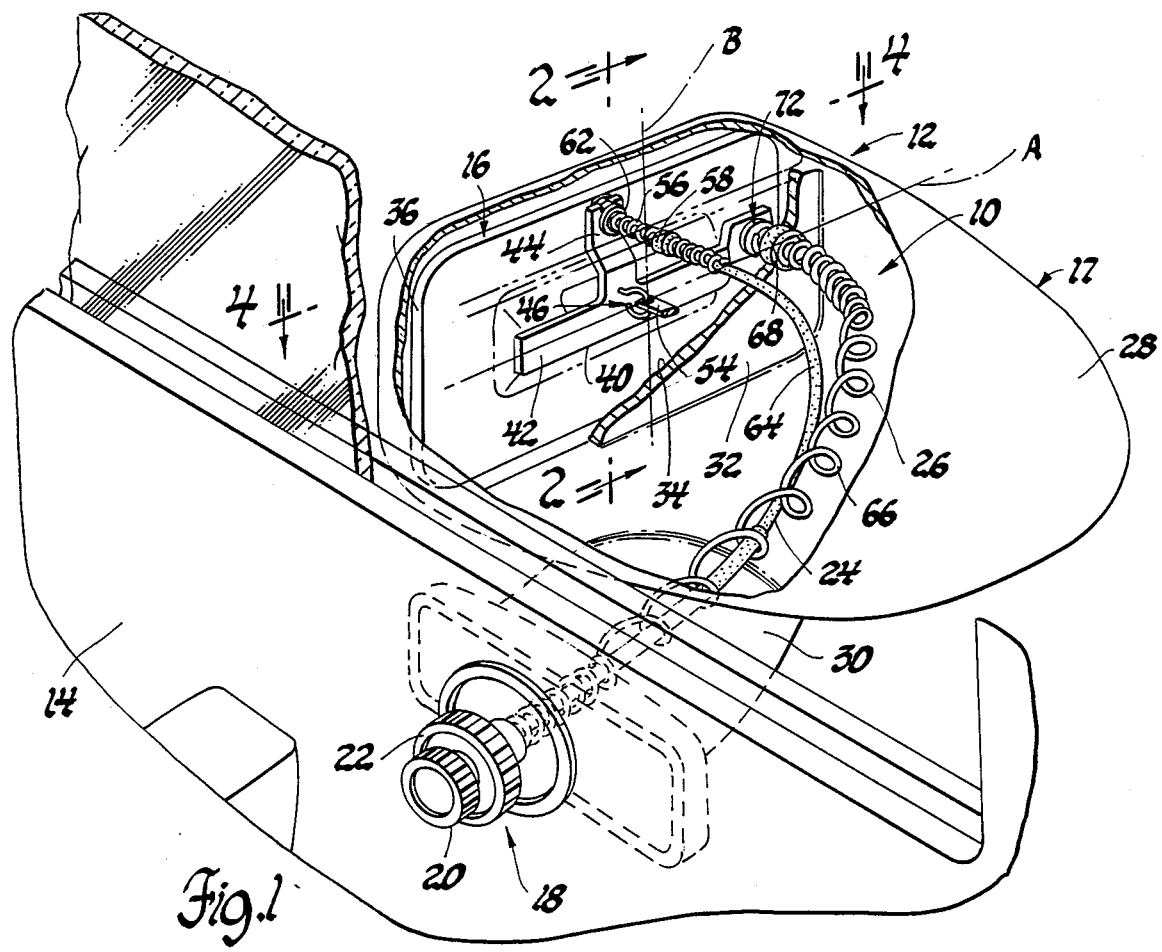
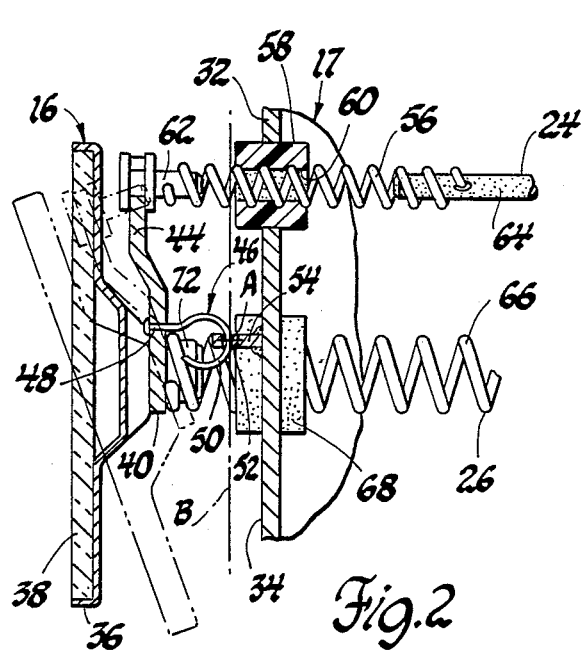
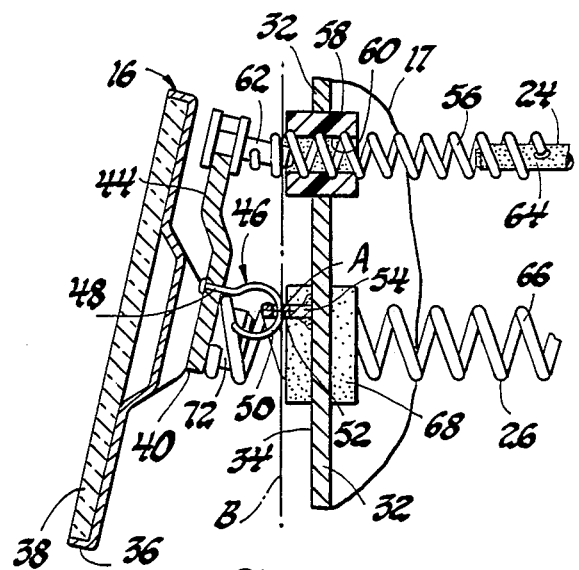

DUAL CONTROL MECHANISM FOR A REMOTELY LOCATED MIRROR

This invention pertains to mechanisms for adjusting the position of a remotely located element and more particularly relates to a mechanism that can be employed with outside rear view mirrors so as to provide remote control means for adjusting the angle of the mirror from within the vehicle.

More specifically, the mechanism according to the present invention is preferably incorporated with a remotely located mirror that includes a housing serving as a mounting bracket. A mirror support having a mirror element mounted therein is universally pivoted on the mounting bracket and a pair of flexible helical spring screw drives are connected at one end to the mirror support at spaced points thereof. The other end of the pair of screw drives is located one within the other and are respectively connected to a pair of knob means so that rotation thereof causes movement of the mirror support about a pair of mutually perpendicular pivot axes for adjusting the position of the mirror support.

The objects of the present invention are to provide a new and improved dual control mechanism which utilizes a pair of flexible helical spring screw drives for selectively positioning a remotely located element about a pair of pivot axes; to provide a new and improved dual control mechanism which includes a pair of screw drives that are connected at one end to a universally supported element at spaced points thereof and are respectively connected at the other end to a pair of knobs which are rotatable about a common axis for adjusting the position of the element, to provide a new and improved mechanism for use with a remotely controlled rear view mirror mechanism and which includes a pair of helical spring screw drives one of which is connected by a flexible shaft to a first knob and the other of which is connected directly to a second knob and is wound about the shaft and configured so as to allow axial movement thereof upon rotation of the second knob; to provide a new and improved mechanism for positioning a remotely located element and wherein the mechanism has actuator means which include a pair of helical spring members one of which is connected at one end to a separate knob and is adapted to move axially upon rotation of the knob and thereby cause movement of the element about a pivot axis; and to provide a new and improved mechanism for use with a remotely controlled rear view mirror and having actuator means which include a pair of helical spring members each of which is connected to a mirror support and is located in an internally helixed mating member so as to cause axial movement of the spring members upon rotation thereof and thereby cause selective positioning of the mirror support about a pair of mutually perpendicular pivot axes.

Other objects and advantages of the present invention will be more apparent from the following detailed description when taken with the drawings in which:

FIG. 1 is a fragmentary perspective view of an automotive passenger vehicle equipped with a dual control mechanism made in accordance with the present invention and employed with a rear view mirror;

FIG. 2 is an enlarged sectional view taken on line 2—2 of FIG. 1 showing the helical spring screw drives employed by the mechanism of this invention;

FIG. 3 is a view similar to that shown in FIG. 2 but shows the mirror support pivoted upwardly about the horizontal pivot axis by the mechanism according to the invention;

Figure 4:
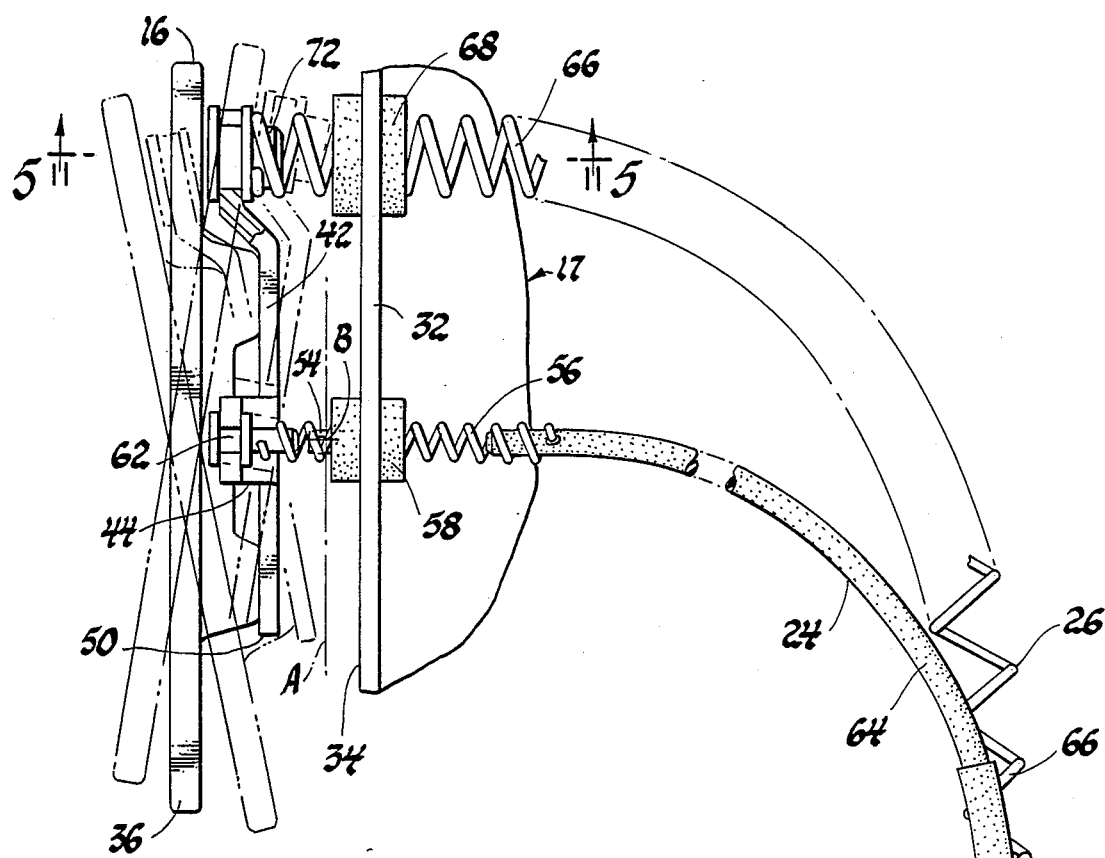
FIG. 4 is an enlarged plan view of the mechanism of this invention taken on line 4—4 of FIG. 1 and shows the interconnection between the two control knobs and the spring members of the helical spring screw drives.

Referring now to the drawings and more particularly FIG. 1 thereof, a dual control mechanism 10 according to the present invention is shown employed with a rear view mirror assembly 12 located on a door of an automotive vehicle exteriorly of the passenger compartment. The mirror assembly 12 includes a mirror support 16 and a housing 17 which serves as a mounting bracket member for mounting the mirror support 16 in a position for rearward viewing by the occupant within the vehicle. The dual control mechanism 10 includes an actuator 18 in the form of a pair of concentric knobs 20 and 22 mounted on the inside panel of the door 14 and a pair of screw drives 24 and 26 which are connected to the mirror support 16 for positioning the mirror support 16 about a pair of mutually perpendicular pivot axes.

More specifically, the housing 17 includes a body portion 28 that is rectangular in cross section and is secured by an integrally formed tubular neck portion 30 to the exterior panel of the door 14. The interior of the tubular neck portion 30 communicates with the hollow interior of the body portion 28 of the housing 17 which is integrally formed with a vertically oriented wall 32 the exterior surface 34 of which carries the mirror support 16.

The mirror support 16 includes a sheet metal support member 36 having a rectangular configuration which conforms to the configuration of the open end of the housing 17 and is located therein. A mirror element 38 is mounted in the front end of the support member 36 while the rear end of the support member 36 rigidly carries a T-shaped member 40 comprising a horizontal arm portion 42 and a vertical arm portion 44. At the intersection of the arm portions 42 and 44, a pivot member 46 is provided in the form of a hook with its straight end 48 fixed to the T-shaped member 40 and its curved end 50 passing through and supported within an aperture 52 formed in a tang 54 centrally secured to the wall 32. The aperture 52 is located at the intersection of a horizontal axis A and a vertical axis B. Thus, the pivot member 46 connects the mirror support 16 to the wall 32 for pivotal movement about the horizontal axis A and the vertical axis B under the control of the helical spring screw drives 24 and 26.

In this regard it will be noted that as seen in FIGS. 1 and 2, the screw drive 24 includes a helical spring member 56 which is threadably received by a nut member 58 rigidly mounted in the wall 32. The nut member 58 has a bore 60 formed with a helix groove which mates with the helix form of the spring member 56 so that upon rotation of the latter, the spring member 56 moves axially relative to the nut member 58. The nut member 58 is rigidly mounted in the wall 32 and the center of the nut member 58 is located in a vertical plane which passes through the vertical axis B. Thus, when the mirror support 16 is in the full line position of FIGS. 1 and 2, the center of the bore 60 of the nut member 58 is horizontally aligned with the longitudinal center axis of a pin 62 rotatably carried by the upper end of the arm portion 44. One end of the spring member 56 is fixed to the pin 62 while the other end of the spring member 56 is fixed to one end of a flexible shaft 64 which can be made of a plastic material. The other end of the flexible shaft 64 extends through the body portion 28 of the housing 17 and through the neck portion 30 and finally through the door 14 and is fixed to the rotatable knob 20 located on the inside panel of the door 14 as seen in FIGS. 1 and 4. As would be understood by those skilled in the art and although not shown, an integral non-helical wire extension of the spring member 56 could be used in place of the shaft 64, the important consideration being that a drive connection be provided which cooperates with the screw drive 26 as will be explained hereinafter.

Figure 5:
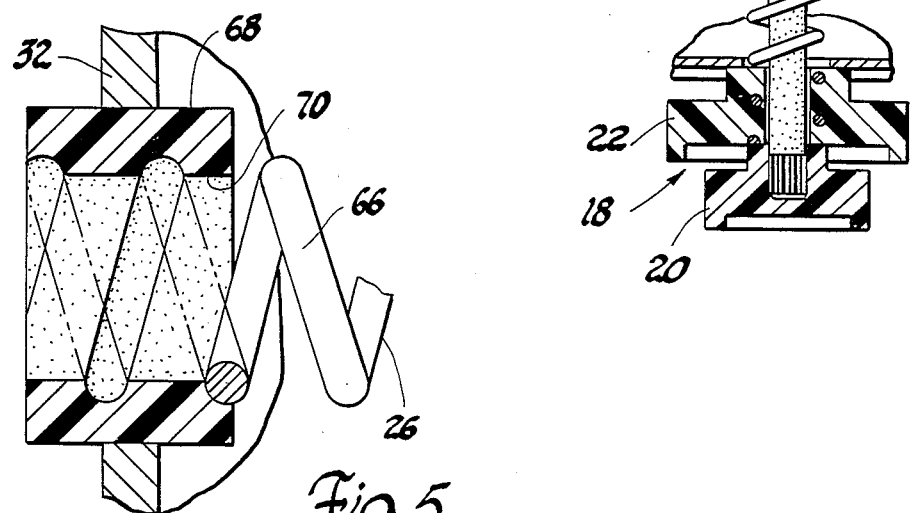
FIG. 5 is an enlarged view of one of the internally helixed nut members which cooperates with a spring member of the screw drive for adjusting the position of the mirror support.

The screw drive 26 is similar to the screw drive 24 in that it also includes a helical spring member 66 one end of which is threadably received by a nut member 68 rigidly mounted in the wall 32. As seen in FIG. 5, the nut member 68 also has a bore 70 formed with a helix groove which mates with the helix form of the spring member 66 so that upon rotation of the latter, the spring member 66 moves axially relative to the nut member 68. The nut member 68 is fixedly mounted in the wall and, when the mirror support 16 is in the full line position of FIGS. 1 and 2, the center of the bore 70 of the nut member 68 is axially and horizontally aligned with the longitudinal center axis of a pin 72 rotatably carried by the right hand end of the arm portion 42 as seen in FIG. 1. As seen in FIG. 2, the longitudinal center axis of the pin 72 is located slightly below a horizontal plane passing through the horizontal axis A. Also, it will be noted that one end of the spring member 66 is fixed to the pin 72, and starting at the nut member 68, the spring member 66 assumes a curved configuration (as seen in FIGS. 1 and 4) which is similar to the curved configuration of the flexible shaft member 64, and then the spring member 66 encircles the shaft member 64 with a plurality of helix sections. The other end of the spring member 66 is fixed to the rotatable knob 22.

From the above description it should be apparent that when the knob 20 is rotated in a clockwise direction as seen in FIG. 1, the shaft 64 will rotate in the same direction and cause the spring member 56 to be similarly rotated causing the latter to move axially outwardly relative to the nut member 58. As a result, the mirror support 16 will be pivoted about the horizontal axis A, from the full line position seen in FIG. 2, to the phantom line position. Afterwards, if the knob 20 is rotated in a counterclockwise direction, the spring member 56 will be similarly rotated relative to the nut member 58 and cause the spring member 56 to be retracted into the nut member 58 so that the mirror support 16 moves about the horizontal axis A from the phantom line position of FIG. 2 towards the full line position of FIG. 3. Also, in order to position the mirror about the vertical axis B, the knob 22 will be rotated in one direction or the other so as to cause the spring member 66 to move axially relative to the nut member 68 in the manner of the spring member 56 and cause movement of the mirror support 16 about the vertical axis B between the phantom line positions and the full line position seen in FIG. 4. During rotation of the spring member 66 and depending upon the direction of rotation of knob 22, one or more of the helix sections wound about the shaft member 64 will either move out of encirclement with the shaft member 64 or move into encirclement therewith and operate somewhat like an escapement mechanism.

One feature of the dual control mechanism 10 described above is that the mirror support 16 is yieldably supported and yet capable of maintaining its adjusted position. As a result, the outer surface of the mirror element 38 can be manually cleaned and, if it should move about the pivot member 46 during the cleaning operation because of any compression or extension of the coil portion of the screw drives 24 or 26 between the associated nut members 58, 68 and the associated pins 62, 72, once the cleaning is completed, the mirror support 16 will automatically return to its adjusted position. Also, for the same reason, the mechanism 10 prevents forceful closing of the door 14 from causing the mirror support 16 to be repositioned once it is adjusted by the knobs 20 and 22.

Various changes and modifications can be made in this construction without departing from the spirit and scope of the invention. Such changes and modifications are contemplated by the inventor and he does not wish to be limited except by the scope of the appended claims.

The embodiments of the invention in which an exclusive property or privilege is claimed are defined as follows:

1. A mechanism for positioning an element about a pair of intersecting pivot axes, said mechanism comprising a mounting bracket member, means universally pivoting said element on said mounting bracket, a pair of flexible helical spring screw drives connected at one end to said element at spaced points thereof, remotely located first and second knob means, the other end of one of said pair of screw drives being connected to a flexible shaft member and the other end of the other of said pair of screw drives having a plurality of helix sections, said helix sections being wound about said shaft member so that a portion of one screw drive is within the other and said helix sections and said shaft member being connected to said first and second knob means so that rotation of one of said knob means causes movement of the element about one of said pair of pivot axes and rotation of said other of said knob means causes movement of the element about the other of said pair of pivot axes while one or more helix sections of said other of said helical spring screw drives unwinds from or winds about said shaft member.

2. The mechanism of claim 1 wherein each of said screw drives at said one end includes a fixed nut member having a bore formed with a helix groove.

3. The mechanism of claim 2 wherein said one end of each of said pair of flexible helical spring screw drives is connected to a rotatable pin carried by said element.

4. A remotely controlled mirror mechanism comprising, a mounting bracket member, a mirror support having a mirror element mounted therein, means universally pivoting said mirror support on said mounting bracket, a pair of screw drives, each of said screw drives including a helical spring member threadably carried by a nut member which is rigidly mounted to said bracket member, said spring member of each of said screw drives being connected at one end to said mirror support, remotely located first and second knob means, the other end of said helical spring member of one of said screw drives being connected to a flexible shaft member which in turn is connected to said first knob means so that upon rotation of said first knob means the mirror support is pivoted about a first pivot axis, the other end of said spring member of the other of said screw drives being connected to said second knob means and having a plurality of helix sections wound about said shaft member so that rotation of said second knob means causes one or more of said helix sections to unwind from or wind about said shaft member and cause movement of said mirror support about a second pivot axis which intersects said first pivot axis.

5. A remotely controlled mirror mechanism comprising, a mounting bracket member, a mirror support having a mirror element mounted therein, means universally pivoting said mirror support on said mounting bracket, first and second screw drives, said screw drives respectively including first and second helical spring members each threadably carried by a nut member rigidly mounted on said bracket member, said first helical spring member being connected at one end to said mirror support, remotely located first and second knob means, the other end of said first helical spring member being connected to a flexible extension member which in turn is connected to said first knob means so that upon rotation of said first knob means the mirror support is pivoted about a first pivot axis, the other end of said second helical spring member having a plurality of interconnected helix sections, said other end of said second helical spring member being connected to said second knob means and having said plurality of helix sections wound about said extension member so that rotation of said second knob means causes one or more of said helix sections to unwind from or wind about said flexible extension member and cause movement of said mirror support about a second pivot axis which is perpendicular said first pivot axis.

6. The mirror mechanism of claim 5 wherein said one end of each of said first and second helical spring members is connected to a pin member rotatably carried by said mirror support.

* * * * *